SYNCHRONIZATION OF PULSE COMMUNICATION SYSTEMS

Filed June 7, 1949 2 Sheets-Sheet 1

INVENTOR
E. PETERSON
BY Harry C. Hart
ATTORNEY

SYNCHRONIZATION OF PULSE COMMUNICATION SYSTEMS

Filed June 7, 1949 2 Sheets-Sheet 2

INVENTOR
E. PETERSON
BY Harry C. Hart
ATTORNEY

Patented Mar. 27, 1951

2,546,316

UNITED STATES PATENT OFFICE 2,546,316

SYNCHRONIZATION OF PULSE COMMUNICATION SYSTEMS

Eugene Peterson, New York, N. Y., assignor to Bell Telephone Laboratories, Incorporated, New York, N. Y., a corporation of New York Application June 7, 1949, Serial No. 97,685

6 Claims. (Cl. 179—15)

Figure 1:
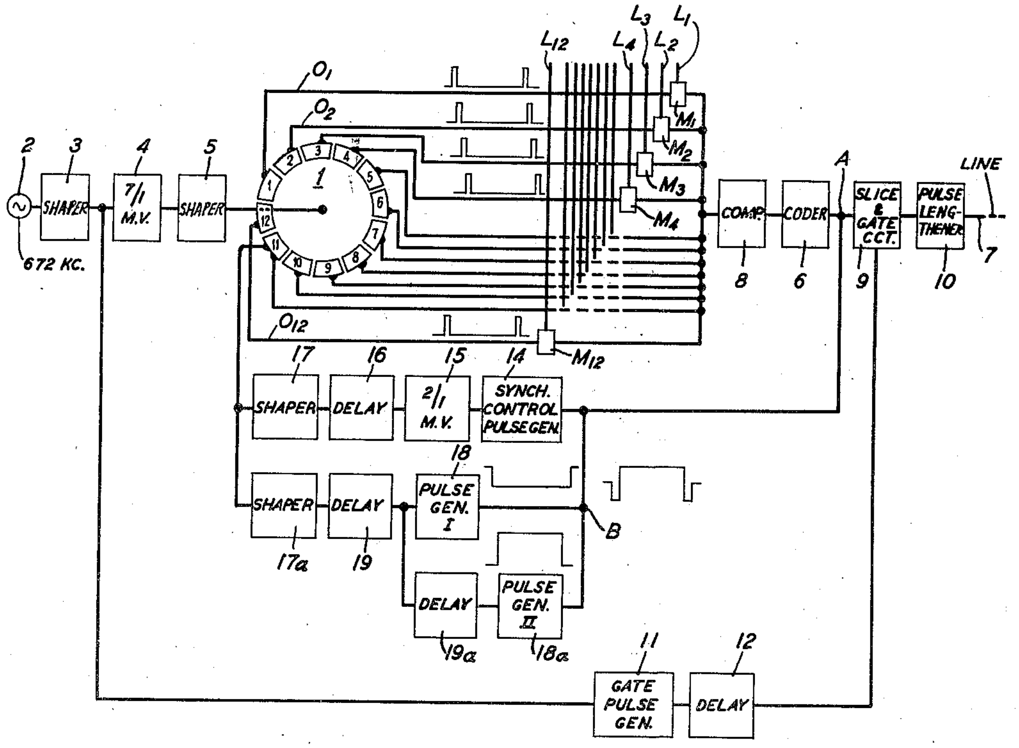

This invention relates to communication by pulse techniques and particularly to the synchronization of receiver apparatus with transmitter apparatus.

A pulse code transmission system is one in which instantaneous amplitude values or "samples" of a message, for example the voice wave of a telephone conversation originating at a transmitter station, are translated into code pulse groups, transmitted in that form to a receiver station, and there decoded or translated into the original message form for delivery to the listener. Such systems have certain known advantages as compared with more conventional systems, among which are their remarkable freedom from interference and their easy adaptability to multiplexing by time division. However, for correct reconstitution of a message and, in the case of a time division multiplex system for correct distribution of the several messages among the several listeners, the receiver apparatus must operate in substantially perfect synchronism with the transmitter apparatus; i. e., it must operate not only at the same frequency or speed, but it must also maintain a preassigned phase relation to a very precise degree. To this end it is known to transmit, in addition to the message information, certain synchronizing information, for example in the form of marker pulses recurring in a preassigned sequence, which hold the receiver apparatus in step with the transmitter apparatus at the correct frequency and in the correct phase or angular alignment. It is also a most desirable feature that the receiver apparatus shall return to correct alignment with the transmitter apparatus, after a momentary interruption of the service, as rapidly as possible. One obvious expedient for securing this result involves the provision, at the receiver, of timing apparatus such as a multivibrator circuit whose natural frequency is slightly lower than that of corresponding timing apparatus at the transmitter, yet not so low but that it can be held in step with the transmitter apparatus. When the phases are correct, the receiver remains locked in step with the transmitter as by the application of the transmitted marker pulses to the receiver timing apparatus. When for any reason the phases are not correct, as for example, when the system is first put in operation or after an accidental interruption of service, the receiver timing apparatus runs at its lower natural frequency so that its phase lag with respect to the transmitter apparatus increases continuously until alignment is once more obtained, at which time the marker pulse, if sufficiently strong, seizes control and holds the receiver in step with the transmitter. Thereupon synchronous operation recommences.

The design of a system of that kind involves making a compromise between two incompatibles. For certainty of locking in step after a temporary drop-out, the frequency difference between the transmitted pulsing frequency and the free-running frequency of the receiver multivibrator must be small, and the synchronizing or marking pulse must be strong. This means a slow receiver drift during the drop-out and the allotment of a substantial amount of frequency space to the synchronizing pulses. If an effort be made to conserve frequency space by weakening the synchronizing pulses or to reduce drifting time by increasing the multivibrator frequency difference, then there arises the possibility of an overshoot with resulting loss of time.

In an application of J. G. Kreer and E. Peterson Serial No. 776,280, filed September 26, 1947 and issued October 31, 1950, as Patent 2,527,638, there is described a system which avoids these difficulties. In that system the restoration of synchronism after a temporary drop-out is accomplished by a process of searching through the incoming pulse signal frame for one or more marker pulses which are located in definite positions in the frame, and examining the successive pulse positions until the marker pulse is found, whereupon the searching process ceases and synchronous operation is resumed. Improvements over that system are described in an application of E. Peterson, Serial No. 77,165, filed February 18, 1949 and issued October 31, 1950, as Patent 2,527,649 and also in an application of E. Peterson, Serial No. 84,683, filed March 31, 1949 and issued October 31, 1950, as Patent 2,527,650. However, the searching process, at least through a part of a frame, which is common to all of these systems, inevitably takes time; and the greater the number of channels, and therefore of pulse positions, in each frame, the greater is the time consumed. Thus, though such systems are quite suitable in cases of a small number of channels such as twelve, they are less satisfactory with a large number of channels, such as twelve hundred.

The present invention approaches the problems of maintaining synchronous operation when possible, and of rapidly restoring it when once lost, by a different avenue. In brief, a loss of synchronism causes the receiver timing apparatus to be reset to a standard reference or "zero" condition. In this condition it awaits the receipt of a special frame marker pulse or code pulse group which recurs at regular intervals, once per frame, in the incoming pulse train, being distinguished by virtue of its form, duration, amplitude, or otherwise from all of the other pulses of the train. The time which elapses between the end of a drop-out and the receipt of the next frame marker pulse cannot exceed a single frame period and is, on the average, one half frame period in length. The occurrence of this frame marker is recognized by a suitable mechanism which then causes the receiver timing apparatus to recommence to operate in synchronism with the incoming pulse train. More particularly, having waited for the marker pulse in the reference condition, it starts immediately in correct phase. Once the receiver has been in synchronous operation for a small number of frames, sufficient to raise a fair inference that operation is correct in all respects and will so continue, it is preferred to disable the path from the marker pulse recognizer, whereupon operation proceeds on the synchronous basis. On the other hand, it is equally possible to allow each of the sequence of code marker pulses to restart the receiver timing mechanism like the first one, thus acting to check or confirm the fact that synchronous operation has been correctly resumed.

Figure 1A:
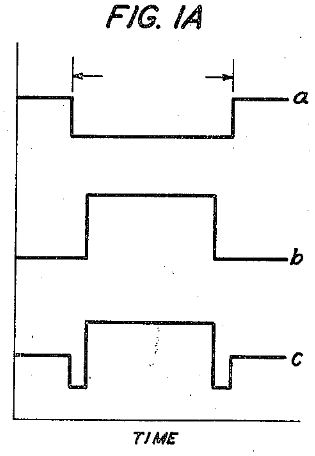
Figure 1B:
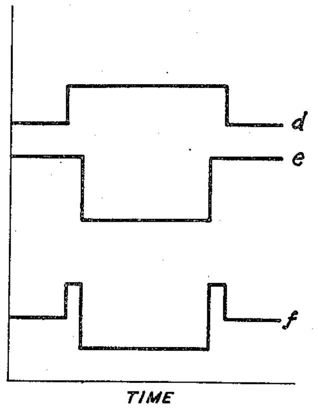
Figure 3:
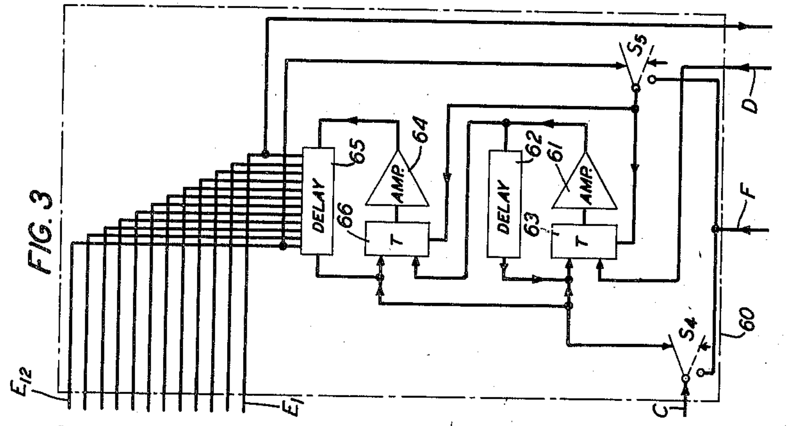
Figure 2:
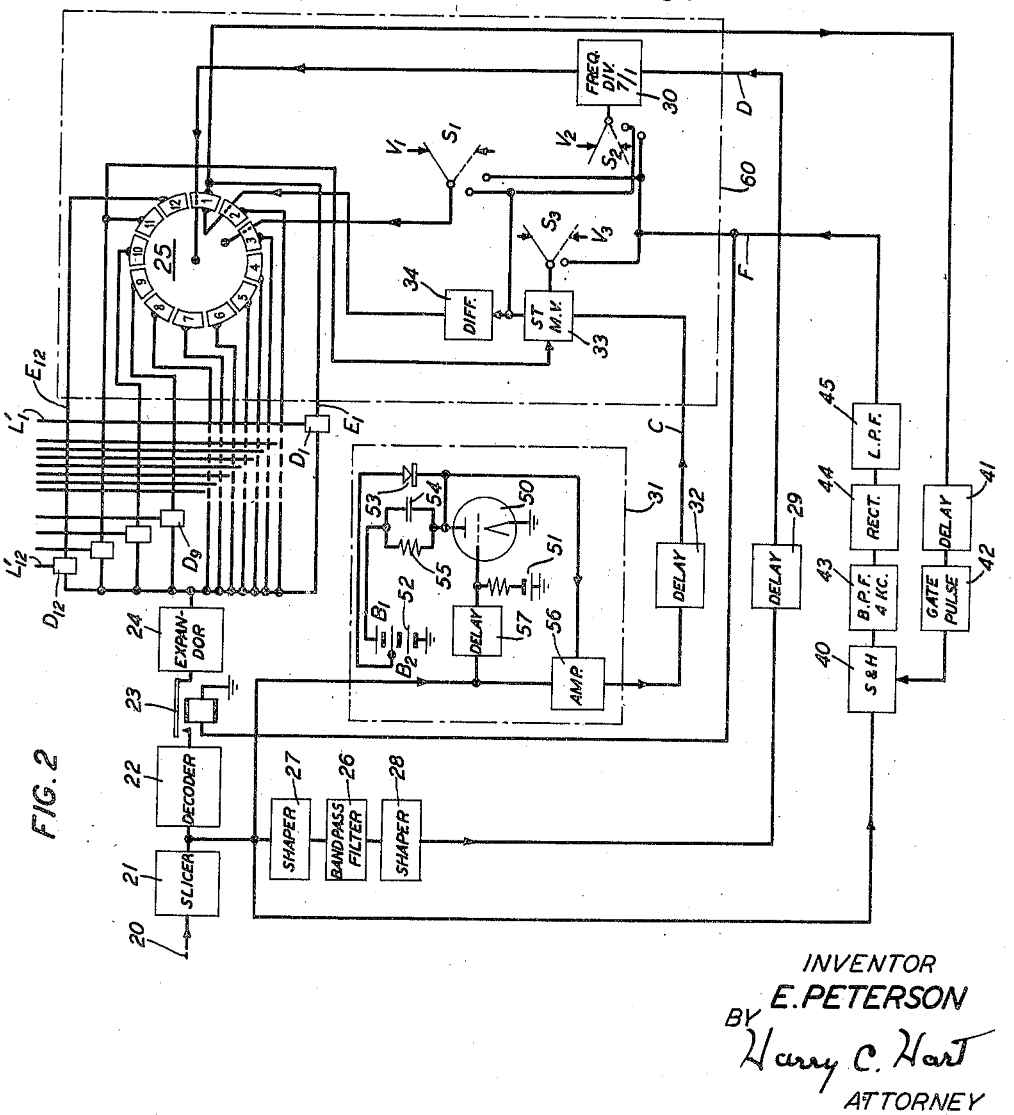

The invention will be fully apprehended from the following detailed description of certain illustrative embodiments thereof, taken in connection with the appended drawings, in which:

Fig. 1 is a schematic block diagram of transmitter apparatus suitable for use in practising the invention;

Fig. 1*a* and 1*b* are groups of wave form diagrams of assistance in explaining the operation of the apparatus of Fig. 1;

Fig. 2 is a schematic block diagram of receiver apparatus embodying the invention; and Fig. 3 is a schematic circuit diagram showing alternative apparatus for a part of Fig. 2.

Referring now to the drawings:

Fig. 1 shows pulse code transmission apparatus which in many particulars is the same as that described in the aforementioned application of E. Peterson and J. G. Kreer to which reference may be made for details. In brief, a number of messages, originating for example with a number of independent talkers such as telephone subscribers, appear on a like number of incoming lines $L_1$ to $L_{12}$. To avoid undue complexity of the drawings, a twelve channel system is illustrated, though a much larger number of channels is contemplated. Each of the lines $L_1$ to $L_{12}$ is connected to one of a bank of modulators $M_1$ to $M_{12}$ which are actuated in cyclic serial order by output pulses of a distributor 1. This distributor may conveniently be a ring circuit of intercoupled astable multivibrators. It may be driven by a train of pulses whose recurrence rate is the product of the number of channels (in the present example, twelve), by the channel sampling rate (for example 8 kilocycles per second) or 96 kilocycles per second. Output pulses of a basic timing source 2 of, for example, 672 kilocycles per second, are first standardized by a shaper 3 and supplied to a frequency divider 4, for example a multivibrator, which derives pulses at the seventh subharmonic of the basic pulse rate. These in turn are standardized by a shaper 5 and applied to the distributor 1. The basic pulse rate, 672 kilocycles, is the product of the sampling rate by the number of channels and by the number of code digits to be employed, e. g. 8 kc. $\times 12 \times 7 = 672$ kc.

The sequential speech samples of the several talkers produced in this manner are then applied to a coder 6 which converts them into binary permutation code pulse groups for transmission, by way of any suitable medium represented by an outgoing line 7, to a receiver station. With the twelve channels assumed, and a seven-digit binary permutation code, there are $12 \times 7 = 84$ such pulses in each full cycle of distributor operation or "frame." To improve the signal-to-noise ratio on the line 7 an amplitude compressor 8 may be interposed ahead of the coder. Individual pulses of the code groups may then be regenerated, as by a slicing and gating circuit 9, to occupy as nearly as possible their correct nominal positions on the time scale, and they may then be lengthened to fill, as nearly as possible, their assigned intervals as by a pulse lengthener 10. The slicing and gating operation may be controlled by a gate pulse generator 11 which is driven by the pulses of the basic timing source 2, a suitable delay device 12 being interposed to balance miscellaneous delays in other parts of the system.

On-off marker or holder pulses may be generated by a synchronizing control pulse generator 14 which may be a multivibrator, under control of a two-to-one frequency divider 15, which, in turn, is controlled by the output of one stage of the distributor 1. These marker pulses are preferably the same in duration and amplitude as the message code pulses, being distinguished from the latter only by virtue of their regular recurrence in alternate frames. Further, they are adjusted in phase by a delay device 16 to occur in the pulse positions occupied by the least significant code elements. In this way the received message quality of the channel in which a marker pulse occurs is degraded only slightly; i. e., from seven-digit quality to six-digit quality.

For the purposes of the present invention there is also generated at the transmitter station a train of special frame marker code pulse groups which recur regularly once per frame and which are appropriately distinguished from all other pulse groups of the train. For illustrative purposes the distinguishing characteristics chosen are the duration of each of these pulse groups and the manner in which they are set off from the other pulses of the train. In particular, a frame marker pulse group is chosen whose duration at one value is longer than $n$ code pulse periods, where $n$ is the number of digits employed in the message code, and which is preceded and followed by a pulse position of a different value. Here the number of digits of the code is seven, so that the frame marker code pulse group endures for at least eight successive code pulse periods at one value or at least ten successive code pulse periods altogether. A code pulse group of this character is most unlikely to occur as a result of encoding two successive message amplitude samples in adjacent channels.

Such a pulse group is conveniently generated by the apparatus shown in the lower part of Fig. 1. A pulse generator 18, which may be a multivibrator, delivers an output pulse of one polarity and of 10 code pulse periods duration. It is triggered by a pulse derived from a suitable stage of the distributor, sharpened by a shaper 17*a* and adjusted as to its occurrence instant by a delay device 19. A second pulse generator 18*a*, similarly triggered, delivers an output pulse of opposite polarity and greater amplitude and of 8 pulse periods duration, starting, however, one pulse period later than the start of the pulse of the first generator. The delay of one pulse period is supplied by a delay device 19a.

The addition at the point B of these two pulses, which are shown at a and b of Fig. 1a, results in the compound pulse shown at c, which has the required characteristics. Of course, the inversion of the pulse c, namely the pulse f of Fig. 1b, would serve as well. This can be obtained merely by inverting the polarities of the output pulses of the two generators, as indicated in curves d and e of Fig. 1b, or otherwise, as preferred.

The train of frame marker pulses and on-off marker pulses is injected into the train of message code pulses at the point A, and serves to mask or replace any message code pulses which might otherwise appear in the pulse positions assigned to them.

After transmission, by radio, wire, or otherwise, to a receiver station shown in Fig. 2, the entire incoming pulse train appears on an incoming line 20. Because they may have been distorted in transmission, each pulse of the train is first standardized in amplitude by a slicer 21 and then applied to a decoder 22. This decoder, which may be of any desired type, translates or converts each separate group of 7 successive binary code pulses into a message amplitude to which it corresponds. Assuming the relay-operated switch 23 to be closed, these samples are applied to an expander 24 which corrects the amplitude distortion introduced at the transmitter station by the compressor 8, and they are then applied together to a group of demodulators $D_1$ to $D_{12}$, which are actuated in cyclic serial order by a distributor 25. Unlike the distributor 1 at the transmitter station, which is a ring of astable multivibrators, the distributor 25 at the receiver is preferably a ring of intercoupled flip-flop or double stability multivibrators such that the conduction condition of the various tubes is advanced step by step by incoming pulses which are applied thereto to drive it, but in which the conduction condition does not advance by itself in the absence of such driving pulses. Thus, assuming the distributor 25 to be started in correct phase as described below, when the driving pulses are applied, the message amplitude samples are distributed among the outgoing lines $L'_1$ through $L'_{12}$.

The distributor 25 may be controlled as to timing by the incoming pulse train in the following manner. A basic timing wave of 672 kilocycles is first derived from the incoming code pulses by means of a very narrow band-pass filter 26 which is tuned to the basic timing rate. Units 27 and 28 may be interposed both ahead of the filter 26 and following it to give the pulses suitable shapes. After the further interposition of a delay device 29 to balance delays in other parts of the system, the resulting 672 kilocycle pulses are applied to a 7-to-1 frequency divider 30, for example a multivibrator. This multivibrator is arranged to be held in an inoperative condition by the application to a suitable point thereof such as the grid of one of its tubes, of a fixed voltage $V_2$ of appropriate value which holds the multivibrator in a fixed condition of conduction despite the application of incoming pulses thereto. This holding voltage is applied to the multivibrator by way of a clamping switch $S_2$ when it is closed. However, during normal operation of the apparatus, this switch is opened so that the multivibrator is enabled for delivering output pulses at one-seventh the repetition rate of the incoming 672 kilocycle pulses, that is to say at 96 kilocycles per second. These 96 kilocycle pulses are applied to the ring distributor 25 to drive it in known fashion.

In accordance with the present invention, the ring distributor 25 is not driven by the incoming driving pulses until receipt and recognition of the frame marker pulse has taken place. Rather, it is held in a standard condition of readiness until that time. Thus a fixed voltage $V_1$ is applied to a suitable control point of the ring by way of a clamping switch $S_1$ so that, prior to the receipt of the first marker pulse, the timing pulses derived from the incoming train of code pulses do not operate to drive the ring. When the first frame marker pulse arrives over the incoming line, it is passed, along with all of the pulses of the incoming train, to marker code pulse recognizer apparatus 31 whose details will be described hereinafter. This apparatus is insensitive to pulses and pulse groups of all types except the particular code pulse group which has been selected for frame marker pulse purposes. On receipt of this code pulse group it delivers a signal of suitable character by way of a delay device 32 to a single trip multivibrator 33. This multivibrator is adjusted to deliver an output pulse whose duration is slightly less than a single frame period. This output pulse is applied to one control terminal of the clamping switch $S_1$ and also by way of a differentiating network 34 which converts its leading edge into a short, sharp pulse, to a preselected stage of the ring distributor 25. Application of the multivibrator pulse to the clamping switch $S_1$ opens the switch, thus removing the holding voltage from the ring distributor 25 and putting it into condition to be driven by incoming driving pulses. The pulse which results from differentiation, by the unit 34, of the leading edge of the multivibrator pulse, applied to one ring stage, for example stage 1, ensures that this stage shall be the one with which operation of the ring 25 first starts.

The pulse output of the single trip multivibrator 33 is also applied to one control terminal of the clamping switch $S_2$, thereby releasing the 7-to-1 frequency divider 30 from its holding voltage $V_2$ and enabling it to operate on receipt of the 672 kilocycle driving pulses.

Thus both the 7-to-1 frequency divider 30 and the ring distributor 25 are released in correct phase for starting at the instant of receipt and recognition of the frame marker pulse and not before. Thereupon the ring 25 is advanced in step-by-step fashion by the output pulses of the 7-to-1 frequency divider 30. However, just prior to the completion of the first revolution of the ring 25, the pulse output of the single trip multivibrator 33 terminates. This termination may be ensured by application to a suitable control point of this multivibrator 33 of a pulse in proper phase derived from one stage, for example stage No. 11, of the ring 25. The termination of this pulse is applied to the control terminals of the clamping switches $S_1$ and $S_2$. Its application to the clamping switch $S_2$ releases the latter and applies the voltage $V_2$ to the 7-to-1 frequency divider 30, thus disabling the latter and so blocking further driving pulses from the ring 25 and putting the frequency divider 30 in its standard or reference phase condition in which it is in readiness for a repetition of the former operations. Application of the termination of the multivibrator pulse to the control terminal of the clamping switch $S_1$ opens this switch and allows the standard voltage $V_1$ to be applied to the control point of the ring distributor, thus halting the step-by-step advance of the distributor and putting it into its reference or standard readiness condition. The details of a suitable circuit by which the distributor may be placed in its reference condition of readiness are shown for example in United States Patent 2,418,521 to G. A. Morton et al.

These events have taken place just prior to the completion of a single frame and thus just before the next frame marker pulse is due to arrive. When it arrives and is recognized as before, the foregoing sequence of events is repeated. Adjustment of the duration of the output pulse of the single trip multivibrator 33 to slightly less than a frame period thus results in the termination of each cycle only by a brief time interval prior to the commencement of the following cycle.

After transmission of a train of pulses with interspersed frame marker pulses has proceeded for a while, the operations are made entirely continuous in the following manner. The incoming pulse train is regularly sampled once per frame by a sample-and-hold circuit 40 under control of the pulse output of one stage of the ring distributor. The sample-and-hold circuit may comprise a clamping switch and a condenser, connected in the manner described in the aforementioned application of E. Peterson Serial No. 84,683, filed March 31, 1949, so that when the switch is closed, the instantaneous voltage of the incoming pulse train is placed on the condenser. The ring output is applied as a sequence of sampling pulses to this sample-and-hold circuit 40 by way of a delay device 41 and a gate pulse generator 42. When the system is operating correctly in frame, this sampling pulse occurs at such an instant that the output of the sample-and-hold circuit contains a 4 kilocycle component of substantial magnitude. This is applied to a band-pass filter 43 and after the condition of correct operation in frame has continued for a matter of ten frames or so, the voltage output of this filter 43 builds up to a substantial magnitude. This output voltage is rectified and smoothed by a rectifier 44 and low-pass filter 45 and applied as a control voltage to the lower control terminals of the clamping switches $S_1$ and $S_2$ to hold them open. This serves to prevent the restoration of the standard voltages $V_1$ and $V_2$ to the ring distributor 25 and to the frequency divider 30, respectively. The filtered output of the sample and hold circuit 40 is also applied to the control terminal of a clamping switch $S_3$ and acts to close the switch, thus applying a holding voltage $V_3$ to a suitable control point of the single trip multivibrator 33, such as the grid of one of its tubes, and so disabling this multivibrator 33 and holding it in a standard reference condition of readiness in the same manner as described above in connection with the ring distributor 25 and 7-to-1 frequency divider 30. Under these conditions, the receiver apparatus continues to advance in synchronous fashion driven by the 96 kilocycle pulse output of the 7-to-1 frequency divider 30 despite any momentary failure of the frame marker pulses.

When for any reason the receiver falls out of synchronism, the output of the 4 kilocycle band-pass filter 43 dies away and allows the clamp switches $S_1$ and $S_2$ to close and the clamp switch $S_3$ to open. Thereupon the frequency divider 30 and the ring distributor 25 are restored to their reference conditions. In these conditions they are in readiness to accept and utilize the next frame marker pulse, and start off correctly in the correct phase immediately the marker pulse is received and recognized. Such receipt and recognition has caused the single trip multivibrator 33 to deliver its nearly-frame-length pulse in correct phase by virtue of its having been held in readiness by the voltage $V_3$. Thus the reframing process, once correct synchronous operation has been lost, takes place in a time not exceeding the duration of a single frame after the output of the filter 26 has built up.

The rectified and filtered output of the 4 kilocycle band-pass filter 43 is also applied to the relay-operated switch 23 holding it normally closed. When the filter output dies away, this switch is allowed to open, thus blocking the decoded amplitude samples from the ring distributor 25 and so preventing distribution to the listeners of incoming messages. It is preferred to put a temporary stop to all message distribution when the receiver distributor is temporarily out of correct frame relations and synchronism.

The apparatus which recognizes the presence of the frame marker code pulse group and initiates the foregoing operations upon its occurrence may take various forms. For example, when the frame marker comprises a specified number of pulses in unbroken sequence, preceded by a space, as indicated in Fig. 1*a*, the recognizer may comprise a pulse counter which starts counting pulses immediately following each blank pulse position but which is restored to a zero or reference condition, that is to say, it is "cleared," upon the arrival of a space. Apparatus of this character is described, for example, in an article by W. H. Bliss entitled "Electronic Digital Counters" published in "Electrical Engineering," vol. 68, page 309, April, 1949. Such apparatus may be arranged in known fashion to generate an output pulse when a count of 8 or more pulses in immediately adjacent sequence has been recorded, but to deliver no output pulse for a count of 7 immediately adjacent pulses or less. By the use of pulse-inverting components of known type, such a counter may be modified to record the presence of 8 or more blank pulse positions or spaces, preceded and followed by a pulse, as indicated in Fig. 1*b*.

Alternatively, the frame marker may be recognized in terms of its duration. Thus, for example, a positive pulse indicating the start of the marker code pulse group may be applied to the grid of a triode 50 which is otherwise held below its anode current cut-off as by a battery 51. The anode is initially at the potential $B_1$ of the terminal of a battery 52. When the tube 50 is caused to conduct by application of the pulse, its anode falls to the potential $B_2$, but is prevented from going to a lower potential by the inclusion of a diode 53 poled as shown. A condenser 54 is thus rapidly charged to the voltage difference $B_1$—$B_2$. When the pulse terminates, the tube 50 becomes non-conductive and the condenser 54 commences to discharge through a resistor 55. The potential of the anode then proceeds to rise gradually, at a rate determined by the magnitudes of the condenser 54 and the resistor 55. By selection of the values of the condenser and the resistor, it may be arranged in accordance with known principles that the anode voltage reaches a preassigned fraction of the battery voltage $B_1$ after the lapse of 8 blank pulse positions, but fails to reach it after the lapse of 7 or less. This anode voltage may be applied as an enabling voltage to the control terminal of an amplifier 56 thus enabling this amplifier, after the lapse of 8 or more blank pulse positions following a pulse to pass, in amplified form, the "on" pulse which concludes the frame marker pulse group; and the output of this amplifier 56 constitutes the output of the marker pulse recognizer. The delay device 57 is included to prevent the concluding pulse of the marker group from discharging the condenser 54 before this concluding pulse has been passed by the amplifier.

As an alternative to the combination of the ring distributor 25, and the 7-to-1 frequency divider 30 and the other associated apparatus enclosed within the broken line 60 of Fig. 2, the apparatus of Fig. 3 may be employed. The system of Fig. 3 makes use of the properties of the combination of an amplifier, a delay device and a trigger gate coupled together in the form of a loop, which combination has come to be known as a pulse recirculation loop and will be so designated in the present specification. Systems of this character are described, for example, in "A Digital Computer for Scientific Applications" by C. F. West and J. E. DeTurk, published in the Proceedings of the I. R. E., vol. 36, page 1452 (December 1948). Here the purpose of the frequency division in the ratio of seven to one which in Fig. 2 is served by the multivibrator 30 is now served by a first pulse recirculation loop comprising an amplifier 61, a delay device 62 and a trigger gate 63, while the ring distributor is replaced by a second pulse recirculation loop comprising an amplifier 64, a delay device 65 and a trigger gate 66. The delay device 65 may be provided with a number of equally spaced taps which actuate the several demodulators $D_1$ through $D_{12}$.

Using the numerical relations employed above in connection with Fig. 2 by way of illustration, the delay of the first delay device 62 may be adjusted to be approximately 7 pulse intervals of the basic pulse repetition rate while the delay of the second delay device 65 may be adjusted to be equal approximately to a single frame period.

In operation, and assuming the switch $S_4$ to be closed, the pulse output of the marker pulse recognizer 31 is applied by way of a conductor C to momentarily enable the trigger gate 63 when the frame marker is received. This trigger gate 63 is arranged to deliver an output only upon the coincidence of input pulses at its two terminals. The timing pulses at the basic pulse rate are applied to the gate 63 by way of the conductor D and, the gate being momentarily enabled, one of them passes through it and through the amplifier 61 to the input end of the first delay device 62. The delay device 29 is adjusted to bring the marker pulse recognizer output into time coincidence with some one of these timing pulses. This pulse then traverses the delay unit 62 whereby it is delayed by 7 pulse intervals, and after this delay it reappears at the output terminals of the delay device 62 where it is applied as an enabling pulse to the trigger gate 63, admitting a new timing pulse. Thus no further inputs are applied to the amplifier 61 after the first input pulse until the arrival, after a delay of 7 pulse periods, of this same input pulse at the trigger gate 63, whereupon on the arrival of the next following time pulse, the operations are repeated. As a result, there is delivered to one of the input terminals of the second trigger gate 66 a sequence of pulses which recur at one-seventh of the rate of the incoming timing pulses.

Thus, from the standpoint of the incoming driving pulses or gating pulses, the system operates as a 7-to-1 frequency divider. From the standpoint of the frame marker pulse, the system operates as a pulse interpolation network; that is, in the present example of twelve channels, it interpolates eleven pulses in the space between successive markers. With input or gating pulses of 672 kilocycles, the output of this first pulse recirculation loop is therefore a train of pulses recurring at 96 kilocycles per second. These are applied as gating pulses to the second pulse recirculation loop which, from the standpoint of these pulses, is a 12-to-1 frequency divider, and which operates in similar fashion to send a pulse through the second delay unit 65 for every twelfth one of the arriving 96 kilocycles pulses. Reentrance of the delayed pulse into the second trigger gate 66 operates as an enabling pulse for the latter, thus allowing the 96 kilocycles pulse which coincides with the delayed pulse to enter the amplifier 64 and go through the recirculation process.

Passage of the delayed pulse from end to end of the delay device 65 and past the lateral taps results in the appearance at each of these taps in succession of a pulse which is then applied on the corresponding one of the several outgoing conductors $E_1$ to $E_{12}$ as a suitable voltage for operating the detectors $D_1$ through $D_{12}$.

When the system is first started and has been in operation for not more than a very few frames, it is restored to its standard reference condition at the end of each frame by a pulse which may be derived, for example, from the output on the conductor $E_{12}$. This pulse is applied by way of a switch $S_5$ to disable both of the amplifier units and so in effect return each of the pulse recirculation loops to a standard reference condition. The next frame marker pulse to arrive then restarts both of them as described above.

When, however, correct operation has been in progress for ten frames or so, the output of the 4 kilocycles band-pass filter 43 has built up in the manner described in connection with Fig. 2, and this is applied by way of a conductor F to the control terminals of clamping switches $S_4$ and $S_5$ to open these switches and thus allow the pulse recirculation loops to operate without interruption.

The apparatus which causes the system to operate in a completely synchronous fashion, namely the sample-and-hold circuit, the band-pass filter, lower control terminals of the switches $S_1$ and $S_2$, switches $S_3$, $S_4$, $S_5$, and associated apparatus, while considered advantageous, are by no means essential, and may, if desired, be omitted. Such omission renders unnecessary the generation of the "on-off" marker pulses at the transmitter, and the apparatus for generating these pulses may therefore be omitted under the same conditions.

In the system of the invention the whole of one time division channel and a fraction of an adjacent one are assigned to transmission of the marker code pulse group to the exclusion of message information. In the illustrative example described and shown above, the marker channels are the twelfth channel and $^3/_7$ of the eleventh channel. In a system of a large number of channels as contemplated, this does not represent a serious loss of information-carrying capacity. However, the particular outgoing lines at the receiver station which correspond to these channels should, of course, not be assigned to subscribers.

What is claimed is:

1. In a synchronous pulse communication system which includes receiver apparatus for reconstituting a message from pulses of an incoming train, which train includes a unique frame marker code pulse group of pulses which is distinguishable from all other pulse groups of said train which apparatus includes a rotative member and depends for correct message reconstitution on synchronous operation of said rotative member in a preassigned phase relation with transmitter apparatus, and includes means for normally advancing said member rotationally in step-by-step fashion in synchronism with transmitter apparatus under control of pulses at the basic pulse repetition rate of said train, means for arresting the advance of said rotative member and for setting it in a standard reference condition of readiness, means whereby said arresting and setting means are operative upon failure of said preassigned phase relation, means for starting the step-by-step advance of said rotative member from said reference condition, and means whereby said starting means are operative upon reception of one of said frame marker code pulse groups.

2. In combination with apparatus as defined in claim 1, means whereby said arresting means are disabled upon establishment of synchronous operation.

3. In a synchronous pulse communication system which includes transmitter apparatus for translating message amplitude samples into a train of code pulses and receiver apparatus for reconstituting a message from pulses of an incoming train, which receiver apparatus includes a rotative member and depends for correct message reconstitution on synchronous operation of said rotative member in a preassigned phase relation with transmitter apparatus, and includes means for normally advancing said member rotationally in step-by-step fashion in synchronism with transmitter apparatus under control of pulses at the basic pulse repetition rate of said train, means in said transmitter apparatus for generating a frame marker code group comprising at least $n+1$ pulses, where $n$ is the number of digits in the message code, and means in said receiver apparatus for arresting the advance of said rotative member and for setting it in a standard reference condition, means whereby said arresting and setting means are operative upon failure of said preassigned phase relation, means for recognizing said frame marker code pulse group when present, means for starting the step-by-step advance of said rotative member from said reference condition, and means whereby said starting means are operative upon reception of one of said frame marker code pulse groups.

4. In a synchronous pulse communication system which includes transmitter apparatus for translating message amplitude samples into a train of code pulses and receiver apparatus for reconstituting a message from pulses of an incoming train, which receiver apparatus includes a rotative member and depends for correct message reconstitution on synchronous operation of said rotative member in a preassigned phase relation with transmitter apparatus, and includes means for normally advancing said member rotationally in step-by-step fashion in synchronism with transmitter apparatus under control of pulses at the basic pulse repetition rate of said train, means in said transmitter apparatus for generating a frame marker code group comprising an unbroken sequence of at least $n+1$ pulses, where $n$ is the number of digits in the message code, and means for blanking a group of $n+3$ adjacent pulse positions of the message code and for interpolating said marker code group in the center of said blank pulse position group, means in said receiver apparatus for arresting the advance of said rotative member and for setting it in a standard reference condition, means whereby said arresting and setting means are operative upon failure of said preassigned phase relation, means for recognizing said frame marker code pulse group when present, means for starting the step-by-step advance of said rotative member from said reference condition, and means whereby said starting means are operative upon recognition of one of said frame marker code pulse groups as present.

5. In a synchronous pulse communication system which includes transmitter apparatus for translating message amplitude samples into a train of code pulses and receiver apparatus for reconstituting a message from pulses of an incoming train, which receiver apparatus includes a rotative member and depends for correct message reconstitution on synchronous operation of said rotative member in a preassigned phase relation with transmitter apparatus, and includes means for normally advancing said member rotationally in step-by-step fashion in synchronism with transmitter apparatus under control of pulses at the basic pulse repetition rate of said train, means in said transmitter apparatus for generating a frame marker code group comprising at least $n+3$ adjacent pulse positions of which the first and last are of one value while all the others are of another value, where $n$ is the number of digits in the message code, means in said receiver apparatus for arresting the advance of said rotative member and for setting it in a standard reference condition, means whereby said arresting and setting means are operative upon failure of said preassigned phase relation, means for recognizing said frame marker code pulse group when present, means for starting the step-by-step advance of said rotative member from said reference condition, and means whereby said starting means is operated upon recognition of one of said frame marker code pulse groups as present.

6. In a synchronous pulse communication system, means at a transmitter station for generating a train of message pulses grouped in a succession of frames, means for regularly interposing a marker pulse in each frame of said train, which marker pulses recur regularly from frame to frame and which are otherwise distinguishable from message pulses, means for further interposing a holder pulse in each alternate frame, which holder pulses are distinguishable from message pulses solely by virtue of their regularity of recurrence, means at a receiver station for deriving from an incoming pulse train a wave having a frequency related to the basic repetition rate of said pulses, a rotative member for controlling the reconstitution of a message from message code pulses, means for applying said wave to said member to advance it in step-by-step fashion when not otherwise restrained, means for setting and holding said member at a preassigned zero position despite the application of said wave, marker pulse recognizing means having a control terminal, means including said marker pulse recognizing means for testing successive pulse positions of said incoming train for the marker pulse, means for disabling said setting-and-holding means, said disabling means having a control terminal, a path extending from said recognizing means to said last named control terminal by way of which said marker pulse, when recognized as present, actuates said disabling means, thereby causing said member to advance, under control of said wave, in correct phase alignment with the incoming pulse train, and means, including a slow-acting switch, for recognizing said holder pulses when present in a particular phase relation, a path extending from said last named means to the control terminal of said marker pulse recognizing means by way of which said particularly phased holder pulses act to disable said marker pulse recognizing means despite momentary interruptions of the incoming train.

EUGENE PETERSON.

REFERENCES CITED

The following references are of record in the file of this patent:

UNITED STATES PATENTS

| Number | Name | Date |
|---|---|---|
| 1,717,049 | Locke | June 11, 1929 |
| 1,823,354 | Dowd | Sept. 15, 1931 |
| 2,112,877 | Beverage | Apr. 5, 1938 |
| 2,380,542 | Nolde | July 31, 1945 |
| 2,442,301 | Locke | May 25, 1948 |